United States Patent
Seo et al.

(10) Patent No.: US 12,223,597 B2
(45) Date of Patent: Feb. 11, 2025

(54) VIRTUAL COSTUME FITTING SYSTEM

(71) Applicants: Kwangwoon University Industry-Academic Collaboration Foundation, Seoul (KR); YESH COMPANY CO., LTD., Seoul (KR)

(72) Inventors: Young Ho Seo, Seoul (KR); Byung Seo Park, Cheongju-si (KR); Eui Seok Hwang, Suwon-si (KR)

(73) Assignees: KWANGWOON UNIVERSITY INDUSTRY-ACADEMIC COLLABORATION FOUNDATION, Seoul (KR); YESH COMPANY CO., LTD., Seoul (KR)

( * ) Notice: Subject to any disclaimer, the term of this patent is extended or adjusted under 35 U.S.C. 154(b) by 87 days.

(21) Appl. No.: 18/065,756

(22) Filed: Dec. 14, 2022

(65) Prior Publication Data

US 2024/0177421 A1 May 30, 2024

(30) Foreign Application Priority Data

Nov. 30, 2022 (KR) .......................... 10-2022-0164738

(51) Int. Cl.
*G06T 17/20* (2006.01)
*G06T 15/04* (2011.01)
*G06Q 30/0601* (2023.01)

(52) U.S. Cl.
CPC .............. *G06T 17/20* (2013.01); *G06T 15/04* (2013.01); *G06Q 30/0643* (2013.01)

(58) Field of Classification Search
CPC .................................. G06T 17/20; G06T 15/04
See application file for complete search history.

(56) References Cited

U.S. PATENT DOCUMENTS 11,498,005 B1 * 11/2022 Waggoner .............. A63F 13/352
2022/0176245 A1 * 6/2022 Lewin ..................... A63F 13/52
(Continued)

FOREIGN PATENT DOCUMENTS

CN 109325990 B * 11/2022 ........... G06T 15/005
KR 10-2014-0108450 A 9/2014
(Continued)

OTHER PUBLICATIONS

Jiang, Yan & Ruiliang, Guo & Ma, Fenfen & Shi, Jinlong. (2019). Cloth simulation for Chinese traditional costumes. Multimedia Tools and Applications. 78. 10.1007/s11042-018-5983-8. (Year: 2019).*

(Continued)

*Primary Examiner* — Kee M Tung
*Assistant Examiner* — Chris Alejandro Puntier
(74) *Attorney, Agent, or Firm* — NKL LAW; Jae Youn Kim

(57) ABSTRACT

Provided is a virtual costume fitting system including: a data input unit that receives a three-dimensional (3D) body model and a costume model; a corresponding point matching unit that matches corresponding points between the body model and the costume model; a costume deformation unit that moves a vertex of the costume model; a pose estimation unit that estimates a pose of the body model; a texture mapping unit that maps a texture of the costume model; a crease surface generation unit that generates a crease of a costume; a texture upgrading unit that updates a texture of the crease; a costume model renewal unit that corrects the texture; a mesh separation unit that separates a 3D mesh; and a mesh integrating unit that integrates the body model with the deformed costume model to generate a body model fitted with the costume.

6 Claims, 33 Drawing Sheets

(56) References Cited

U.S. PATENT DOCUMENTS

| | | | | |
|---|---|---|---|---|
| 2022/0258049 A1* | 8/2022 | Kanani | ............. | G06Q 30/0621 |
| 2022/0318892 A1* | 10/2022 | Lee | .......................... | G06T 7/12 |
| 2022/0319140 A1* | 10/2022 | Wu | ...................... | G06T 17/205 |
| 2022/0375151 A1* | 11/2022 | Hu | ......................... | A63F 13/69 |

FOREIGN PATENT DOCUMENTS

| | | |
|---|---|---|
| KR | 10-1710521 B1 | 2/2017 |
| KR | 10-2018-0069786 A | 6/2018 |
| KR | 10-2020-0067511 A | 6/2020 |
| KR | 10-2021-0056595 A | 5/2021 |
| KR | 10-2365750 B1 | 2/2022 |
| KR | 10-2022-0042126 A | 4/2022 |
| KR | 10-2448758 B1 | 9/2022 |

OTHER PUBLICATIONS

Shane Transue, et al., Generative Deformation: Procedural Perforation for Elastic Structures, http://graphics.ucdenver.edu/physics_simulations.html, University of Colorado Denver Computer Graphics and VR Lab, 2017, University of Colorado Denver, Denver, USA.

Evangelos Kalogerakis, Aaron Hertzmann, Karen Singh, "Learning 3D Mesh Segmentation and Labeling", ACM Transactions on Graphics, vol. 29, No. 3, Jul. 2010 (also in SIGGRAPH 2010, Los Angeles, USA).

* cited by examiner

VIRTUAL COSTUME FITTING SYSTEM

BACKGROUND OF THE INVENTION

1. Field of the Invention

The present invention relates to a virtual costume fitting system which allows a virtual costume to be fitted on a person's virtual body and allows a three-dimensional (3D) costume model to be worn on a 3D body model using a structural relationship between a costume and a body made in the form of 3D graphics.

2. Description of the Related Art

In accordance with the development in technologies, many technologies for displaying a user's avatar in real-time by simulating a user's body to be displayed on a display device have recently been developed. Examples of a field in which such technologies are mainly applied include general retail stores such as department stores and clothing stores. When buying clothes offline, customers try to wear the clothes themselves because they cannot meet their expectations just by looking at the clothes, and in this case, it takes a long time to wear the clothes and makes the customers uncomfortable. In this case, the customers try to virtually wear clothes through their avatars without wearing the clothes, thereby improving the user's convenience. This technology also refers to a so-called magic mirror system, which displays a user's appearance on the display device as if it is reflected in a mirror and has a function that allows the user to virtually fit a desired costume [Patent Documents 1 to 3].

In addition, the virtual costume fitting technology may be applied to a field of generating virtual humans or virtual avatars. That is, a model of virtual humans or virtual avatars may be generated and act in a virtual space. In particular, such virtual humans may frequently change costumes and act like normal people. In this case, costumes need to be appropriately fitted on the virtual human model, and creases of the costumes need to be realistically represented.

However, in the related art [Patent Documents 1 to 3], a user's figure is scanned to extract a static body model, and costumes are fitted on the body model. Therefore, the movement of the virtual body model and the like may not be processed at all in the related art. That is, in the related art, the motion of the body model may not be simulated or the movement of costumes according to the motion may not be processed.

In order to overcome the problems, a technology for representing a fitted state of virtual costumes by reflecting estimation or change of a subject's posture has been presented [Patent Document 4]. However, in the above related art, a 3D human body model is mapped to a 2D human body model to combine the 2D human body model with a costume image and restore it back to a 3D model. That is, the related art may not allow the costume model to be directly fitted on the 3D human body model because a 3D model for costumes is not configured.

RELATED ART DOCUMENT

Patent Documents (Patent Document 1) Korean Unexamined Patent Publication No. 10-2020-0067511 (published on Jun. 12, 2020)

(Patent Document 2) Korean Unexamined Patent Publication No. 10-2022-0042126 (published on Apr. 4, 2022)

(Patent Document 3) Korean Registered Patent No. 10-1710521 (issued on Feb. 27, 2017)

(Patent Document 4) Korean Registered Patent No. 10-2365750 (issued on Feb. 22, 2022)

Non-Patent Documents (Non-Patent Document 1) SHANE TRANSUE, et al., Generative Deformation: Procedural Perforation for Elastic Structures, University of Colorado Denver Computer Graphics and VR Lab, 2017, University of Colorado Denver, Denver, USA.

(Non-Patent Document 2) EVANGELOS KALOGERAKIS, AARON HERTZMANN, KAREN SINGH, "Learning 3D Mesh Segmentation and Labeling", ACMTransactions on Graphics, Vol. 29. No. 3, July 2010 (also in SIGGRAPH 2010, Los Angeles, USA).

SUMMARY OF THE INVENTION

In order to solve the above problems, an object of the present invention is to provide a virtual costume fitting system which combines a 3D costume model with a 3D body model to allow a costume to be fitted on the 3D costume model using a structural relationship between the costume and a body made in the form of 3D graphics.

Another object of the present invention is to provide a virtual costume fitting system which selects a 3D body model as a target model to deform a 3D costume model corresponding to a source model, and combines the 3D body model with the deformed 3D costume model to generate a body model fitted with a costume.

In order to achieve the above object, the present invention relates to a virtual costume fitting system including: a data input unit that receives a three-dimensional body model and a three-dimensional costume model (hereinafter, a first costume model); a corresponding point matching unit that matches corresponding points between the body model and the first costume model; a costume deformation unit that deforms the costume model by performing deformation transfer based on the body model serving as a target, using a corresponding point relationship; a pose estimation unit that estimates a pose of the body model; a crease surface generation unit that generates, with respect to the deformed costume model (hereinafter, a second costume model), creases of a costume according to joints of the pose; a texture mapping unit that maps a texture of the first costume model with respect to a costume model on which the creases are generated (hereinafter, a third costume model); a texture upgrading unit that corrects a texture of the third costume model; and a mesh integrating unit that integrates the body model with the corrected costume model to generate a body model fitted with the costume.

In addition, in the virtual costume fitting system according to the present invention, the corresponding point matching unit may set initial corresponding points for the first costume model(S) and the body model (T) using at least two extreme points, may sample a vertex $p_i$ between the initial corresponding points in the first costume model(S), may sample a vertex $q_i$ between the initial corresponding points in the body model (T), may calculate a correspondence between surfaces based on the sampled vertex $p_i$ to calculate a connection set $(p_i, q_i)$ of a corresponding point $(q_i)$, may remove the connection from the connection set by regarding connection between $p_i$ and $q_i$ as a bad pair if $q_i$ already has another connection when one $p_i$ is connected to a plurality of $q_i$, and may match a final connection set $(p_i, q_i)$ to the corresponding point.

In addition, in the virtual costume fitting system according to the present invention, the costume deformation unit may deform the costume model according to a deformation transfer method, may deform the costume model by performing calculation to minimize a distance between the corresponding points, and may deform the costume model by performing calculation on parameters of rotation, translation, scale, and shear to move the corresponding points and all vertices between the corresponding points.

In addition, in the virtual costume fitting system according to the present invention, the pose estimation unit may generate projection images for four directions from the body model, may extract two-dimensional (2D) joints from each projection image using a neural network, restores the 2D joints in each direction into a 3D space, may calculate an intersection point for the joints in the 3D space, may estimate the calculated intersection point as a joint, and may estimate a skeleton connecting between the estimated joint and the joint.

In addition, in the virtual costume fitting system according to the present invention, the crease surface generation unit may generate basic creases through physics simulation based on a shape of the body, may generate the creases based on a joint, may generate the creases by fetching a predetermined crease profile for each part of the joint of a human body, and may adjust a weight of the crease profile or a total mesh area, and the number of meshes according to a motion state of the body model.

In addition, in the virtual costume fitting system according to the present invention, the texture updating unit may repeatedly deform the texture of the third costume model to minimize a difference between a texture image of a projection image of the first costume model and a texture image of a projection image of the third costume model.

In addition, in the virtual costume fitting system according to the present invention, the system may further include a costume model renewal unit that separates the third costume model, corrects the texture of the third costume with reference to a separated region, and corrects the texture to maintain consistency of a mesh within a corresponding region according to the separated region or corrects the texture based on a boundary between the regions.

As described above, according to the virtual costume fitting system according to the present invention, the 3D costume model is fitted on the 3D body model using the structural relationship between the costume and body generated in 3D models, such that the body can be combined with the costume in a 3D state, thereby accurately and naturally representing a 3D motion.

BRIEF DESCRIPTION OF THE DRAWINGS

FIGS. 10A and 10B are exemplary images of an object that is rotated after the principal component analysis according to one embodiment of the present invention, in which FIG. 10A is an exemplary image of the object before rotation, and FIG. 10B is an exemplary image of the object after rotation.

FIGS. 11A and 11B are exemplary images for a method for projecting a 3D body model (Eric) into a 2D image to extract a skeleton according to one embodiment of the present invention, in which FIG. 11A is an exemplary image in which an axis-aligned bounding box (AABB) is set, and FIG. 11B is an exemplary image for projection of the object onto four planes.

FIGS. 12A, 12B, 12C and 12D are resulting images in which the 3D model is projected onto the 2D image according to one embodiment of the present invention, in which FIG. 12A is an exemplary image of the 3D model as viewed from the front side, FIG. 12B is an exemplary image of the 3D model as viewed from the right side, FIG. 12C is an exemplary image of the 3D model as viewed from the back side, and FIG. 12D is an exemplary image of the 3D model as viewed from the left side.

FIGS. 14A and 14B are diagrams showing a process of removing an error joint and generating a 3D joint according to one embodiment of the present invention, in which FIG. 14A is a diagram showing a process of forming an intersection region by projection of the joint, and FIG. 14B is a diagram showing a process of detecting the 3D joints on spatial coordinates.

FIGS. 15A, 15B, 15C and 15D are exemplary images for three frames of Eric data according to one embodiment of the present invention, in which FIG. 15A is an exemplary image of a mesh, FIG. 15B is an exemplary image of a 3D body model and a correct skeleton, FIG. 15C is an exemplary image of a skeleton before correction, and FIG. 15D is an exemplary image of a point cloud, a correct skeleton, and a skeleton after correction.

FIGS. 16A and 16B are resulting images of creases generated on the 3D costume model according to one embodiment of the present invention, in which FIG. 16A is an exemplary image of a costume deformed based on the body, and FIG. 16B is an exemplary image for physics simulation and a costume with creases.

FIGS. 17A and 17B are resulting images of creases generated after wearing the costume on the body according to one embodiment of the present invention, in which FIG. 17A is an exemplary image of a result in which the costume is worn on the body, and FIG. 17B is an exemplary image for a result of generating the creases on the costume.

DETAILED DESCRIPTION OF THE INVENTION

Figure 1A:
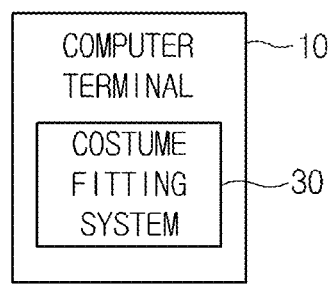
FIG. 1A-1B are diagrams illustrating a configuration of an overall system for carrying out the present invention.

Hereinafter, embodiments of the invention will be described below in detail with reference to the accompanying drawings.

In the description of the embodiments, the same elements are denoted by the same reference numerals and will not be repeatedly described.

First, a configuration of an overall system for carrying out the present invention will be described with reference to FIGS. 1A-1B.

As shown in FIG. 1A, a virtual costume fitting system (hereinafter, costume fitting system) according to the present invention may be implemented as a program system on a computer terminal 10, which receives a costume model and a body model to output a body model fitted with a costume.

That is, the costume fitting system 30 may be implemented as the program system on the computer terminal 10 such as a personal computer (PC), a smartphone, or a tablet PC. In particular, the costume fitting system may be configured as the program system, and installed and executed on the computer terminal 10. The costume fitting system 30 provides a service for generating a body model fitted with a costume by using hardware or software resources of the computer terminal 10.

Figure 1B:
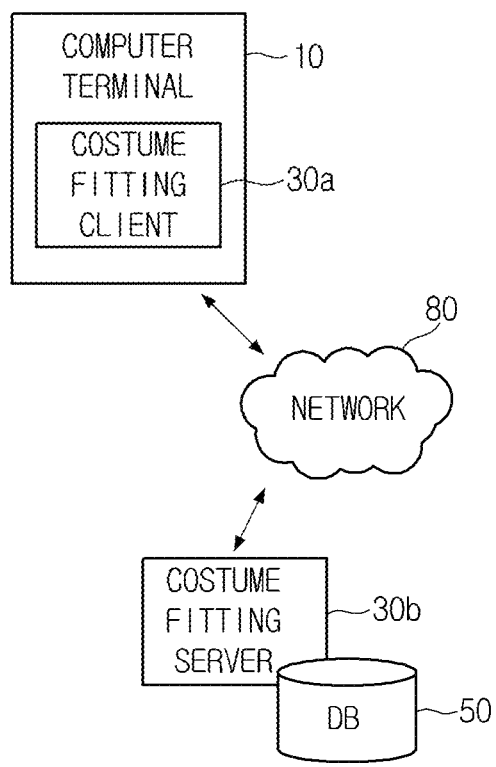

In addition, as another embodiment, as shown in FIG. 1B, the costume fitting system 30 may be configured and executed as a server-client system including a costume fitting client 30a on the computer terminal 10 and a costume fitting server 30b.

Meanwhile, the costume fitting client 30a and the costume fitting server 30b may be implemented according to a typical method for configuring a client and a server. That is, functions of the overall system may be shared according to performance of the client or an amount of communication with the server. Hereinafter, the system is described as a costume fitting system, but it may be implement in various sharing forms according to the method for configuring a server and a client.

Meanwhile, as another embodiment, the costume fitting system 30 may be implemented by including one electronic circuit such as an application-specific integrated circuit (ASIC), in addition to including a program and operating in a general-purpose computer. Alternatively, the costume fitting system may be developed as a dedicated computer terminal that exclusively processes only the generation of a body model fitted with a costume. The costume fitting system may be implemented in other possible forms.

Next, a virtual costume fitting system according to one embodiment of the present invention will be described with reference to FIG. 2.

Figure 2:
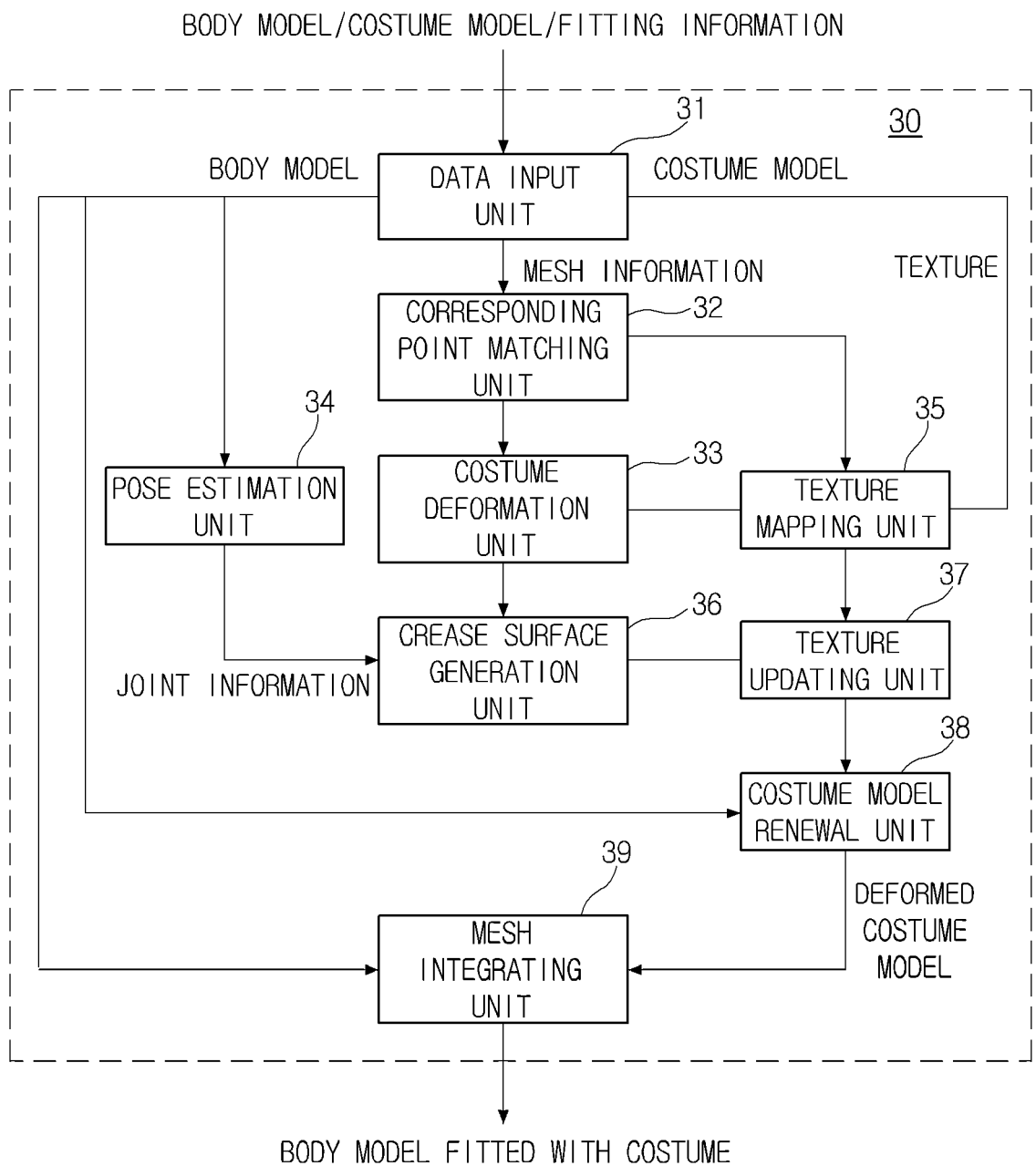
FIG. 2 is a block diagram for a configuration of a virtual costume fitting system according to one embodiment of the present invention.

As shown in FIG. 2, the virtual costume fitting system according to the present invention includes: a data input unit 31 that receives a three-dimensional (3D) body model and a costume model; a corresponding point matching unit 32 that matches corresponding points between the body model and the costume model; a costume deformation unit 33 that moves a vertex of the costume model using a corresponding point relationship; a pose estimation unit 34 that estimates a pose of the body model; a texture mapping unit 35 that maps a texture of the costume model in the form of the body model; a crease surface generation unit 36 that generates creases of a costume according to the pose using joints of a human body; a texture upgrading unit 37 that updates a texture of the creases using information about the joints and motions of the human body; a costume model renewal unit 38 that corrects the texture; and a mesh integrating unit 39 that integrates the body model with the deformed costume model to generate a body model fitted with the costume.

First, the data input unit 31 receives a body model, a costume model, fitting information, etc.

The body model refers to a body model of a person, and is formed of a three-dimensional mesh. In addition, the body model includes texture information on the three-dimensional mesh. In addition, the body model may include rigging information (joint and frame information) and movement information.

The costume model refers to a model for a costume, is formed of a three-dimensional mesh, and includes information about texture on a mesh (particularly, UV texture data, etc.). The costume model may also include physical information (material, weight, etc.) and rigging information (joint and frame information).

In addition, the fitting information includes information about a shape of costumes (dresses, two-piece suits, pants, tops, bottoms, underwear, etc.), mapping information with the body model (e.g., information about which specific positions of a costume model need to be attached to which specific positions of the body model). The mapping information refers to preset data and is data that is manually specified. For example, the mapping data of the fitting data is mapping data for locations corresponding to upper shoulder, waist, arm, etc.

Generally, when the costume is mapped to the body, a portion connected between a part of the body and a part of the costume is specified in advance. For example, information, such as which part of the costume corresponds to a person's shoulder and which hole in the costume passes a person's arm or waist, is specified. The fitting information or the mapping information may be determined using pre-learned information about the costume.

Next, the corresponding point matching unit 32 obtains information about a location between the costume and the body, in particular, two matching information such as extreme points and corresponding points. The extreme point is a main vertex that serves as a reference when the costume is mapped to the body, and the corresponding point refers to a correspondence relationship between all vertices of the body and the costume model. When the corresponding point of the 3D costume model is determined, the vertex of the 3D costume model is deformed into a corresponding vertex of the 3D body model.

The costume fitting system according to the present invention selects a 3D body model as a target model from 3D mesh data, selects a 3D costume model as a source model, and deforms the 3D costume model, which is the source model, into the 3D body model, which is the target model.

Therefore, first of all, the extreme points and the corresponding points that may serve as references for matching shapes of the body and the costume are determined.

Figure 3:
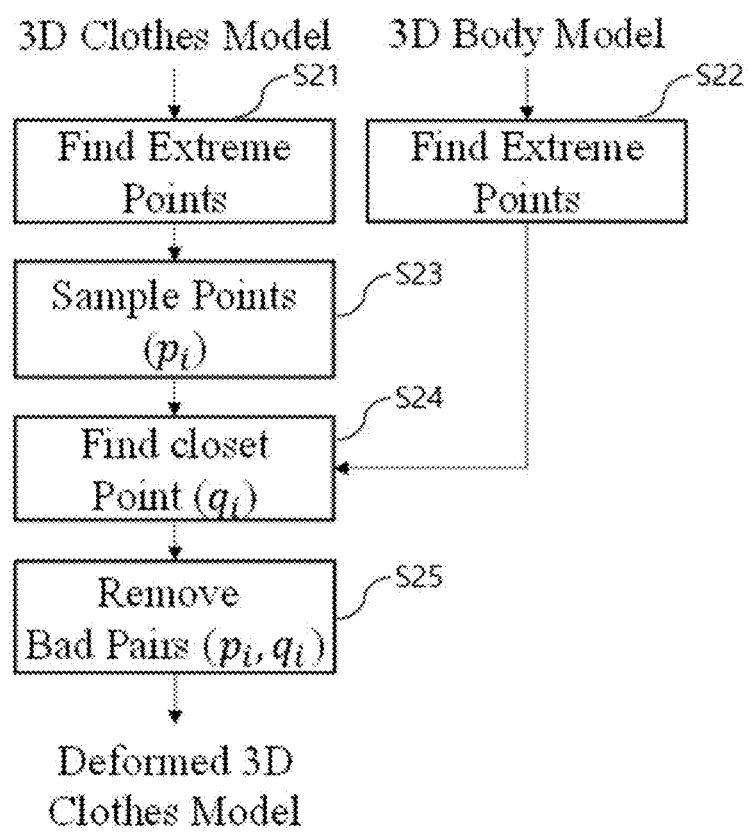
FIG. 3 is a flowchart describing a method for finding extreme points and corresponding points according to one embodiment of the present invention.

A method for finding corresponding points is illustrated in FIG. 3. The correspondence of surfaces (S, T⊂R³) of a source frame (costume model) and target frame (body model) is expressed through f:S→T, and a concept of initial corresponding points proposed in iterative closest point (ICP) is extended and applied to the finding of corresponding points.

First, initial corresponding points are set as a plurality of extreme points of S and T between feature points that may be firmly matched and some specific samples such as the center of the model (S21 and S22). As for the extreme points, data that is manually specified by a user is received or the previously mapping data of the fitting information is used. The extreme points of S and T are initialized as corresponding points with each other. The extreme points of S and T serve as initial data that may obtain corresponding points such as feature points.

Figure 4:
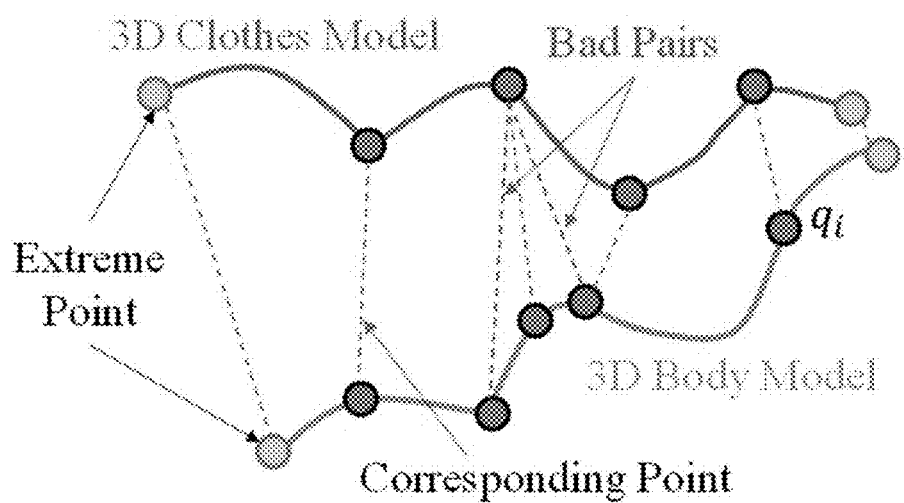
FIG. 4 is a diagram illustrating a relationship between extreme points and corresponding points according to one embodiment of the present invention.

As shown in FIG. 4, similarly to ICP, when the initial corresponding points between S and T are determined, vertices between the initial corresponding points are sampled, respectively (S23). That is, a vertex $p_i$ between the initial corresponding points in S is sampled, and a vertex $q_i$ between the initial corresponding points in T is sampled. A correspondence relationship between the surfaces is calculated based on the sampled vertex $p_i$ to calculate a set $(p_i, q_i)$ of a closet corresponding point $(q_i)$ (S24).

After performing this process, bad pairs are generated due to a connection error. When one $p_i$ is connected to a plurality of $q_i$, if $q_i$ already has another connection, the connection between $p_i$ and $q_i$ may be regarded as a bad pair, and the connection is removed (S25). In addition, when the corresponding point $p_i$ of the source frame is not connected to the corresponding point of the target model, the corresponding point is left while being unconnected.

Figure 5:
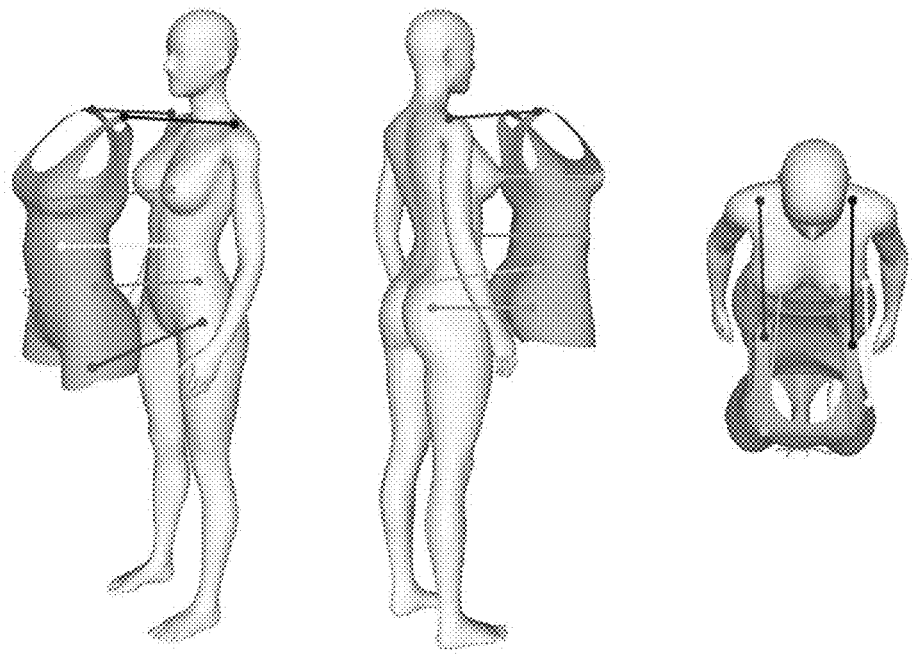
FIG. 5 is an exemplary diagram for a result of estimating extreme points between a body and a costume according to one embodiment of the present invention.

FIG. 5 illustrates an example for a result in which extreme points between the body and the costume are selected. Since a general shape of the human body is fixed, the extreme points for most human bodies hardly change. Thus, it is possible that the extreme points for the body and the costume are selected in advance. However, corresponding points generated based on the selected extreme points may vary.

Next, the costume deformation unit 33 moves the three-dimensional coordinates (locations) for the vertex of the 3D costume model using a relationship between the extreme points and the corresponding points. That is, the costume model is deformed based on the body model serving as a target.

Figure 6:
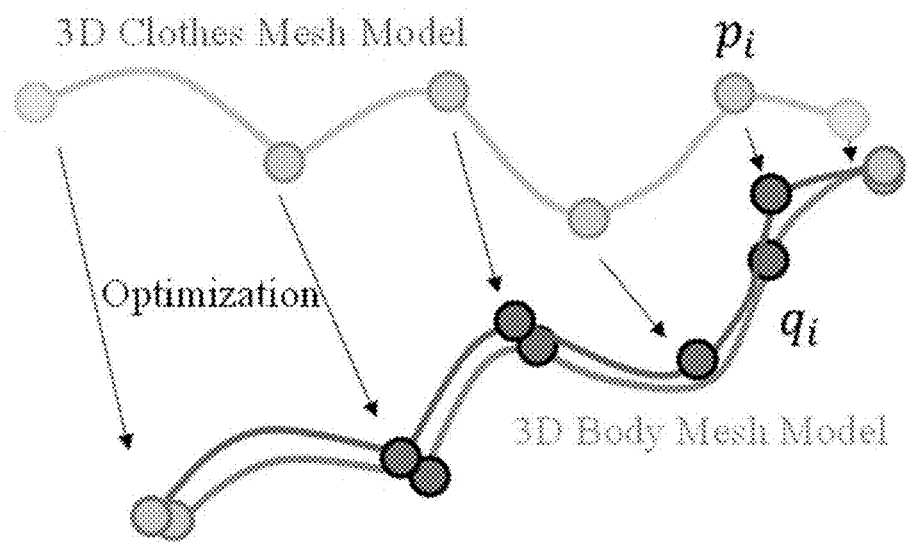
FIG. 6 is a diagram illustrating a process of deforming a 3D costume model based on a 3D body model serving as a target according to one embodiment of the present invention.

In the deformation step, a method for aligning surfaces is to minimize the distance between the corresponding points as shown in FIG. 6. The 3D costume model S is gradually deformed into the form of the 3D body model T by repeatedly optimizing the corresponding points until the minimization of the distance between the corresponding points can be achieved. That is, the 3D mesh of the source frame is deformed into the form of the 3D mesh (or target mesh) of the target frame.

That is, the deformation is implemented according to a deformation transfer method by performing calculation to minimize the distance between the corresponding points. Not only simply reducing the distance between the corresponding points, but also calculating parameters of rotation, translation, scale, and shear and applying the parameters to the corresponding points and all vertices between the corresponding points to move the corresponding points and all vertices between the corresponding points.

Figure 7:
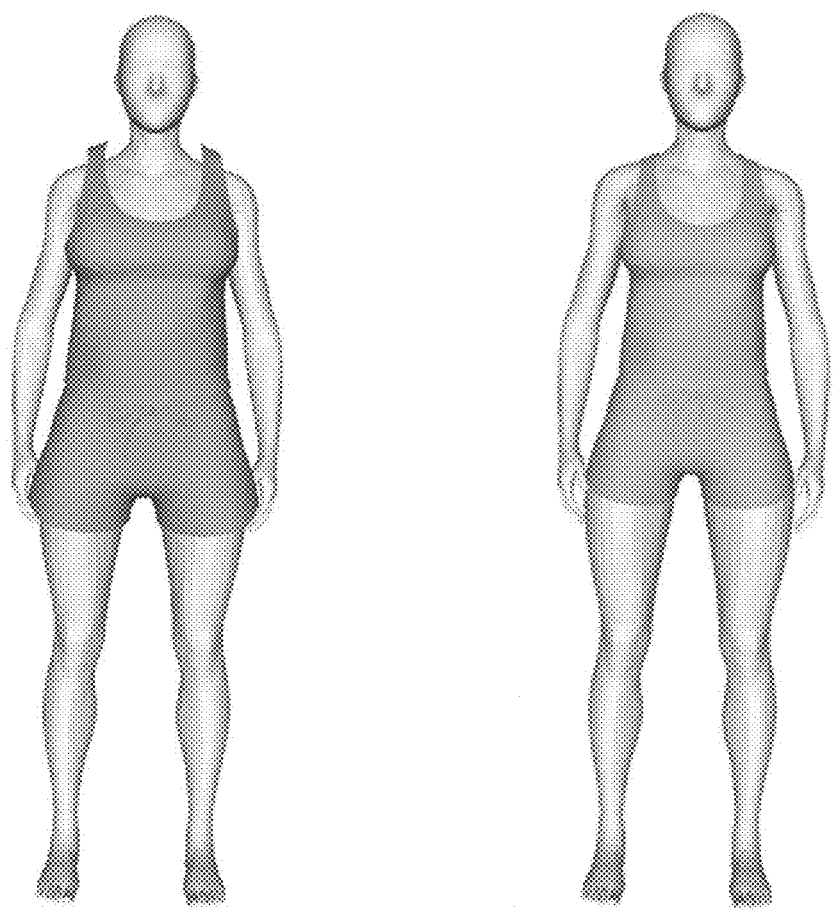
FIG. 7 is an exemplary diagram for a result of deforming the 3D costume model based on the 3D body model serving as a target to allow a costume to be fitted on the 3D body model according to one embodiment of the present invention.

FIG. 7 shows a result of deforming the 3D costume model into the 3D body model. As shown in FIG. 7, a specific space is required between the 3D costume model and the 3D body model, and a size of the specific space (interval) is determined by a predetermined value according to a size of the body, a type of the costume, etc.

Meanwhile, a correspondence relationship in meshes between the original costume model and the deformed costume model is stored. In addition, preferably, even in the subsequent process, a correspondence relationship (mesh change information) when the costume model is changed is all stored as a history.

Next, the pose estimation unit 34 estimates skeleton information including a pose, in particular, joints and frames (skeletons) of the body model.

The skeleton information is used to refer to a location where creases are generated in the human body by using 3D pose estimation for the 3D body model. In addition, structural information (structural data) that analyzes a motion of the human body may be generated to adjust frequency and strength of the creases according to the motion.

Figure 8:
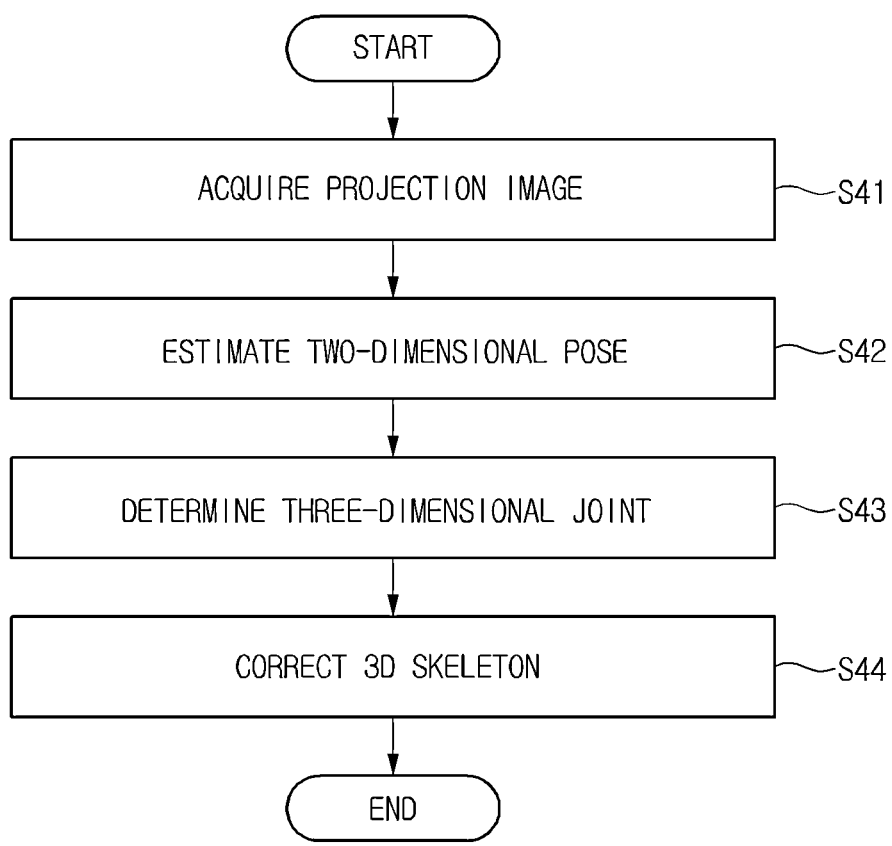
FIG. 8 is a flowchart describing a process of extracting a 3D skeleton of the body model according to one embodiment of the present invention.

As shown in FIG. 8, first, projection images for four planes (directions) are generated from the 3D body model to estimate a 3D pose of the 3D body model (S41). Next, 2D joints (and skeletons) of the projection image are extracted using a neural network such as an OpenPose library (S42), a two-dimensional skeleton image in each direction is restored, and an intersection point for the joints in the 3D space is calculated for calculation of the 3D skeleton (S43). Finally, post-processing for extracting the 3D skeleton with high precision is performed (S44).

That is, the pose of the body model is estimated by estimating a structure of the skeleton including joints and frames (skeletons).

When the projection image is input to the OpenPose network to extract 2D joints, accuracy of the skeleton extracted from the projected image in a front direction may be the highest. Therefore, a spatial distribution of three-dimensional coordinates of the body model (or three-dimensional coordinates of the point cloud) is analyzed to find a front surface of the object and rotate the object so that the front direction of the body model is parallel to a Z-axis direction. Principal component analysis (PCA) is used to find the front direction. The principal component analysis is used to find principal components of distributed data.

Figure 9:
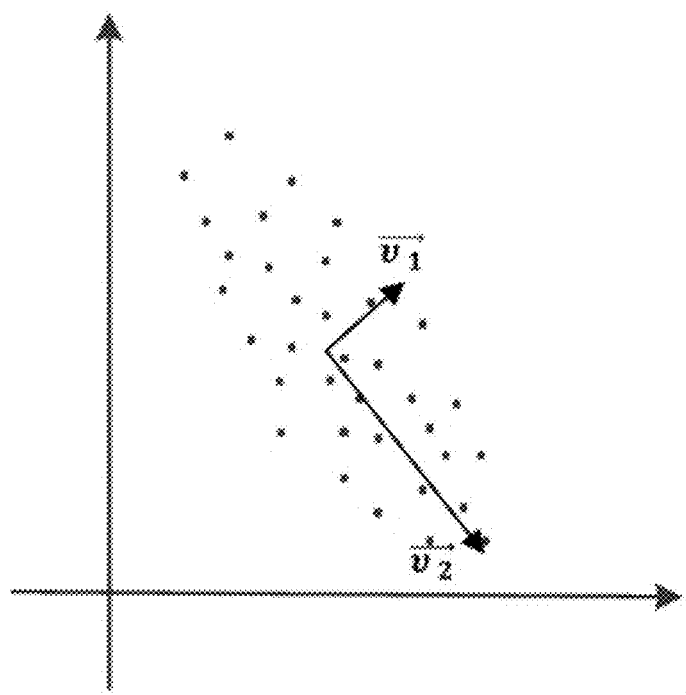
FIG. 9 is an exemplary diagram for two-dimensional principal component analysis (PCA) according to one embodiment of the present invention.

FIG. 9 is a diagram for two vectors $\vec{v_1}$ and $\vec{v_2}$ that are found using the principal component analysis when the data are distributed in an elliptical shape on a two-dimensional plane. The two vectors $\vec{v_1}$ and $\vec{v_2}$ may best represent distribution characteristics of the data. When directions and magnitudes of these vectors are recognized, it is possible to simply and efficiently grasp which form the data distribution has.

Figure 10A:
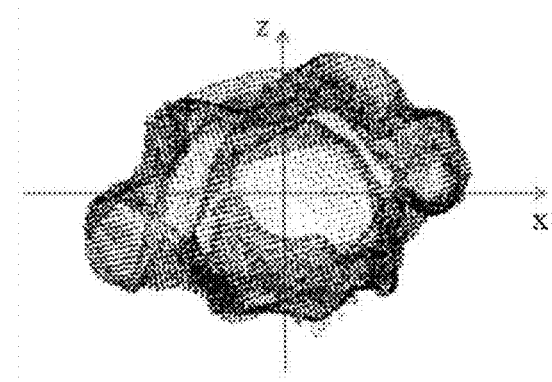
Figure 10B:
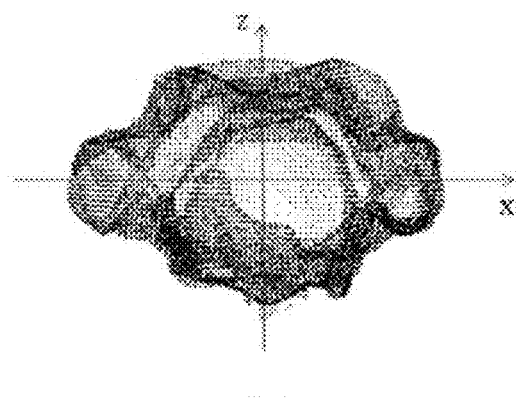

When the PCA is applied to the 3D body model, 3D vectors for x-, y-, and z-axes capable of most simply representing the distribution of the 3D body model. Since the distribution of the y-axis, which is a longitudinal direction of the object, is not required to find the front surface thereof, the 3D body model is projected onto an xz plane, and the PCA is performed on the 2D plane. In the PCA, first, a covariance matrix is found, and two eigenvectors for the matrix are obtained. Between the two obtained eigenvectors, a vector having a small eigenvalue is a vector corresponding to v in FIG. 9, and this vector represents the front direction. FIGS. 10A and 10B shows that in order to easily define a virtual plane, the object is rotated using the vector found through the PCA so that the front surface of the 3D body model is the z-axis.

Figure 11A:
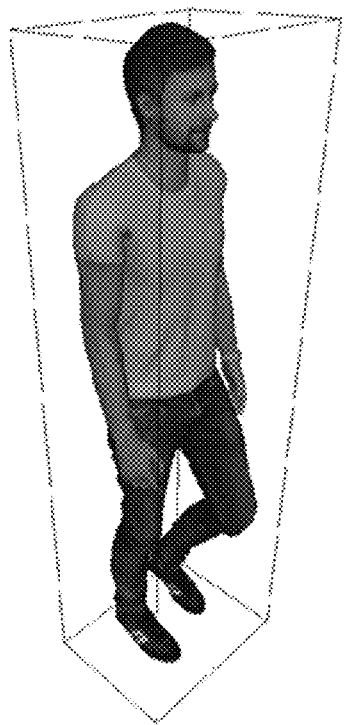
Figure 11B:
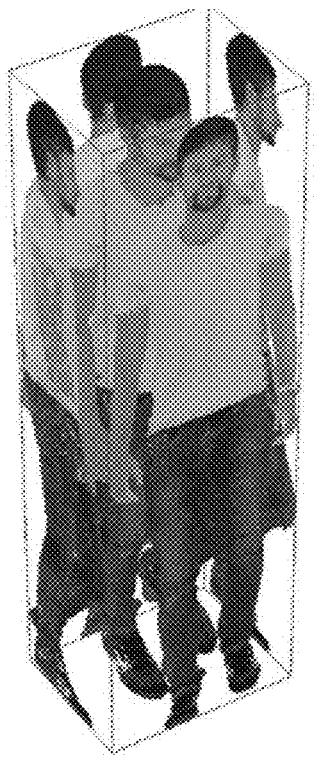
Figure 12A:
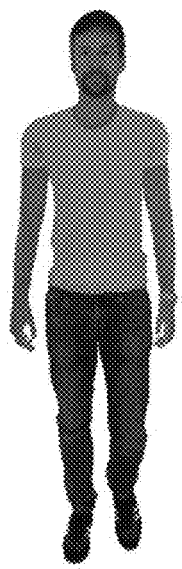
Figure 12B:
Figure 12C:
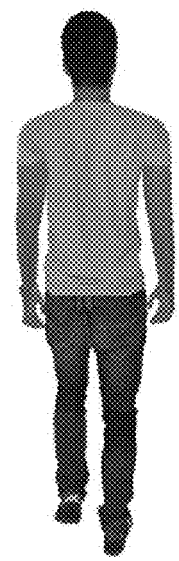
Figure 12D:
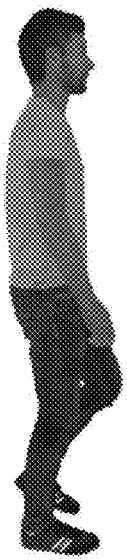

After finding the front surface of the object, an axis-aligned bounding box is set to determine a projection plane in a space. In a process of projecting the three-dimensional plane onto the two-dimensional plane, the AABB is converted into coordinates on the projection plane from a world coordinate system through a model view projection matrix, which is a 4×4 matrix. FIGS. 11A an 11B shows a method for setting the AABB on the object and projecting the object onto four side surfaces. In addition, FIGS. 12A, 12B, 12C and 12D shows four images projected onto each plane.

Figure 13:
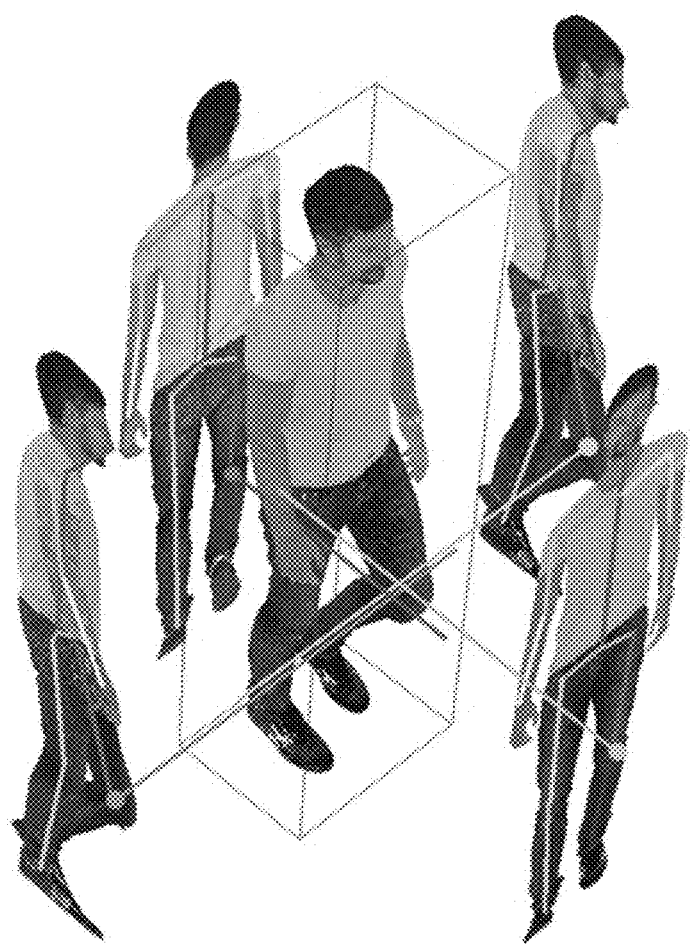
FIG. 13 is an exemplary image for extraction of 3D joints of a left shoulder of the 3D body model according to one embodiment of the present invention.

After going through a restoring process from a coordinate system of a 2D skeleton pixel to the three-dimensional coordinate system again, joint coordinates extracted on the four projection planes positioned in the space are calculated. Four coordinates intersecting in the space are obtained by connecting the coordinates matched on the four planes. FIG. 13 illustrates extraction of 3D joints of a left shoulder of the 3D body model.

Figure 14A:
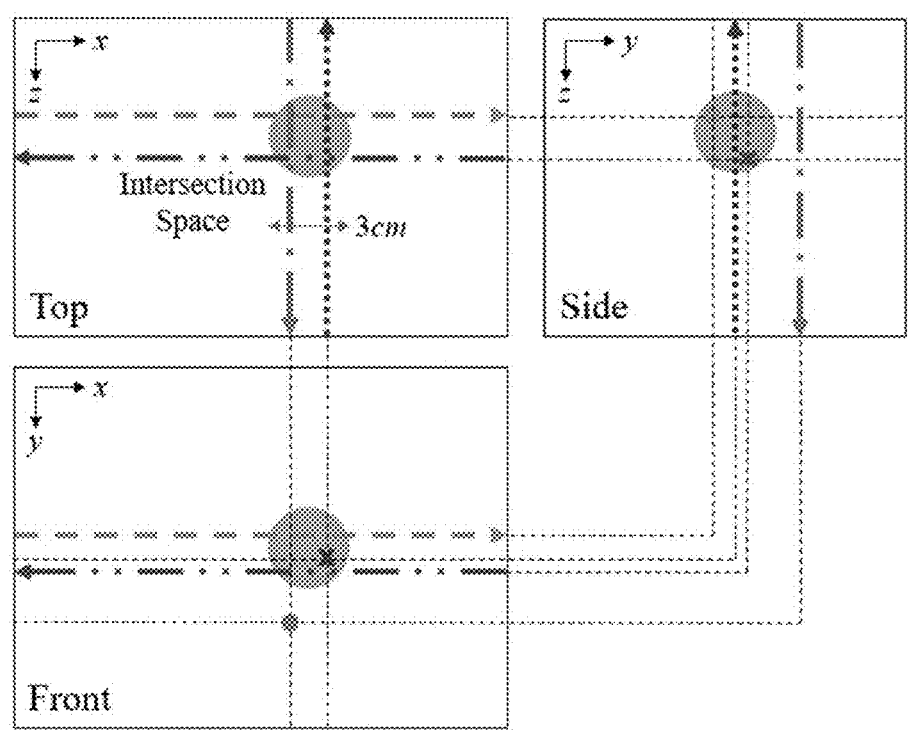
Figure 14B:
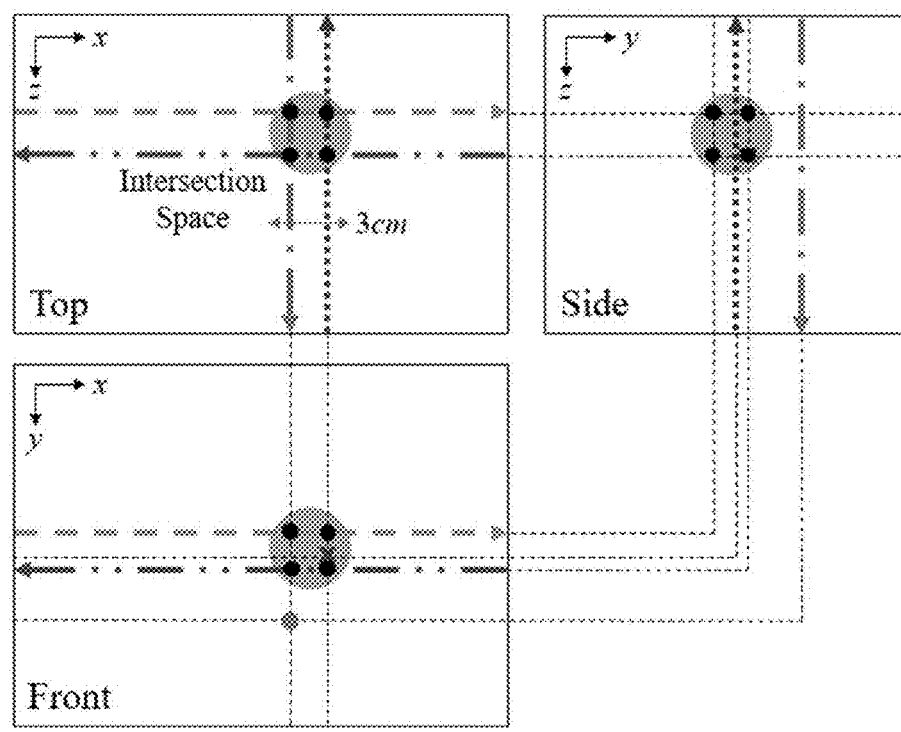

The 2D pose estimation necessarily has errors, and projection lines that are out of the intersection point space are generated due to the errors. As illustrated in FIG. 14A, it can be seen that a one-dotted projection line on the back side is out of the intersection space when checking from the front and the side. Experimentally, a diameter of the intersection space is set to a predetermined range (e.g., 3 cm). That is, when a virtual projection line does not pass through the space after defining a 3D virtual sphere, joints by the virtual projection line are not included in calculation of integrating the 3D joints. An average coordinate is calculated after defining four points from three view-points for the 3D joints using candidate coordinates that are not removed. The coordinates (x, z) are determined from the top, and the y coordinate is determined from the side. The calculated coordinates (x, y, z) need to match the coordinates (x, y) from the front. This process is shown in FIG. 14B.

Figure 15A:
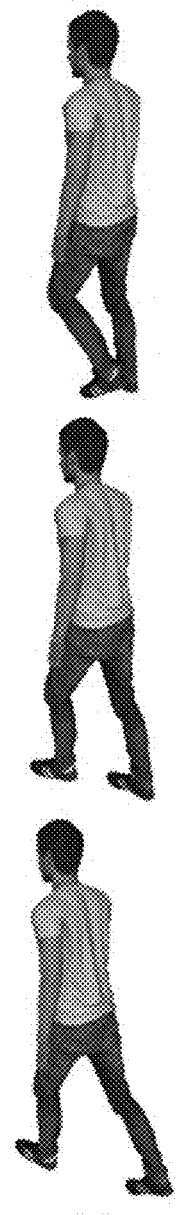
Figure 15B:
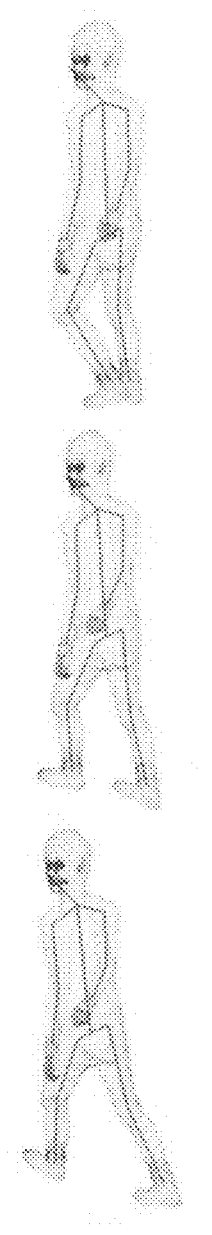
Figure 15C:
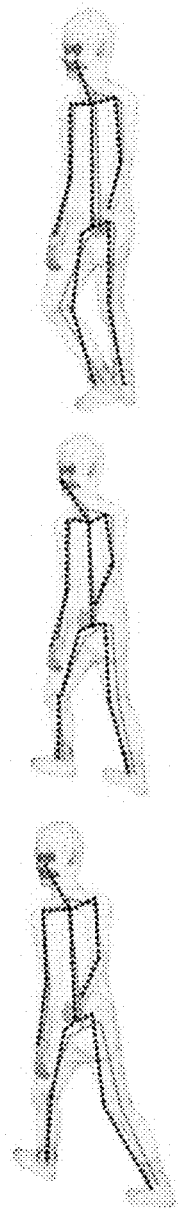
Figure 15D:
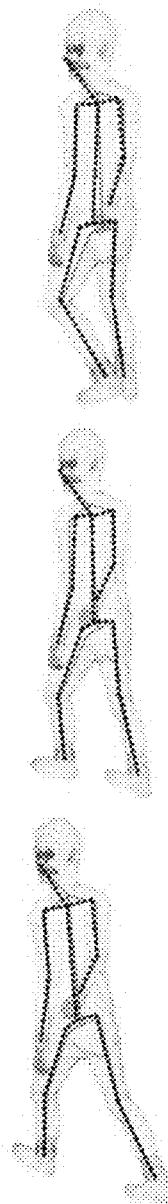

FIGS. 15A, 15B, 15C and 15D show that a skeleton result for three frames of an Eric object is visually displayed on the 3D model. In two drawings, FIG. 15A is a 3D model, and the solid line in FIG. 15B is a skeleton corresponding to a correct answer. FIG. 15C shows that a skeleton obtained by the present invention is indicated by a dotted line. Regarding a result for a first frame in FIG. 15C, it can be seen that a joint for a left leg is not correct. It can be seen that the joint of the left leg is out of a region outside the object. FIG. 15D shows a result after a correction algorithm is applied thereto. Regarding a result for the first frame of FIG. 15D, it can be seen that an error for the left leg almost disappears. It can be seen from second and third frames of FIG. 15C that some errors occur in the joint of the right ankle. It can be observed that phenomenon in which some of the skeletons are out of the 3D object due to the error for the joint of the right ankle. After applying the correction algorithm, it can be seen from the result of FIG. 15D that the errors are all enhanced.

Next, the crease surface generation unit 36 makes creases on a part of the costume according to a pose of a body using joint information of a person. In particular, the crease surface generation unit 36 directly makes the creases on the previously deformed costume model. That is, a crease surface is generated by changing the mesh of the deformed costume model.

Figure 16A:
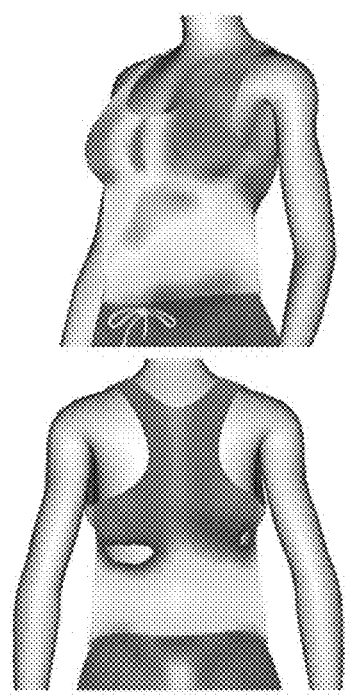
Figure 16B:
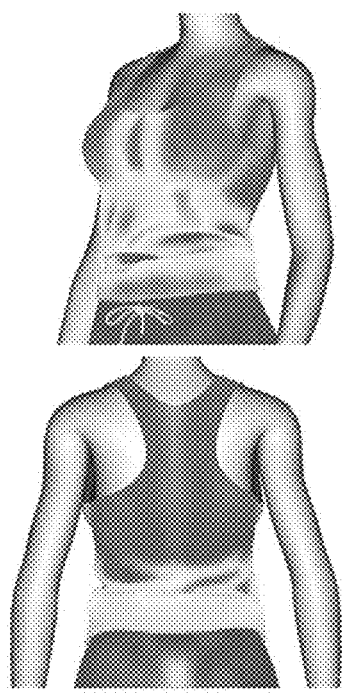
Figure 17A:
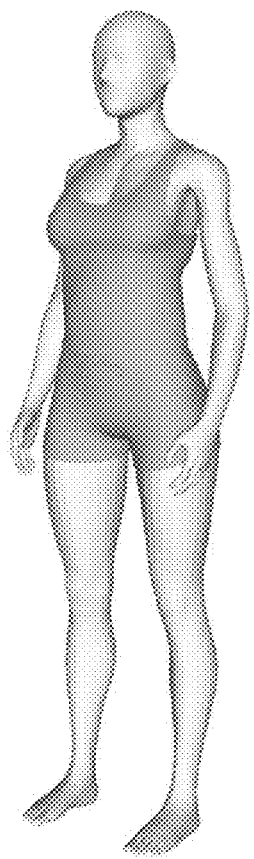
Figure 17B:
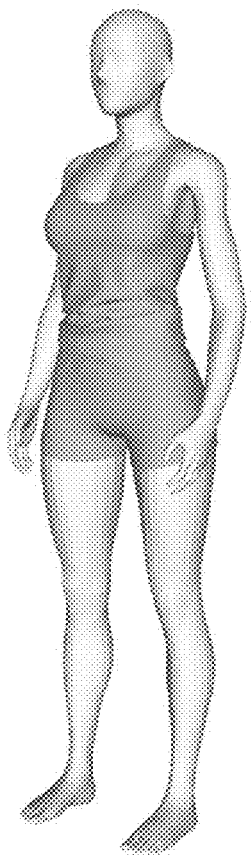
Figure 18A:
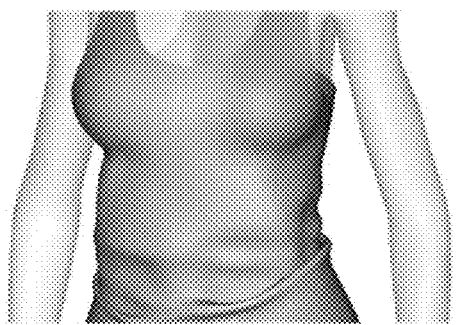
FIGS. 18A, 18B, 18C and 18D are images showing a change in creases by adjusting a crease weight according to one embodiment of the present invention.
Figure 18B:
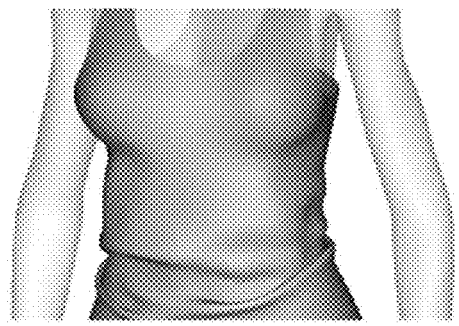
Figure 18C:
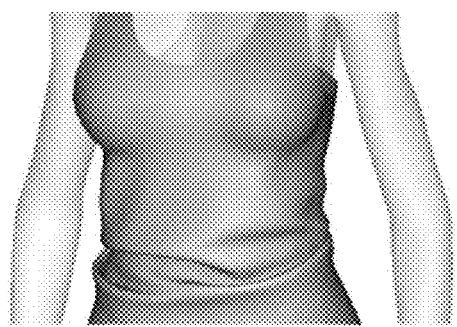
Figure 18D:
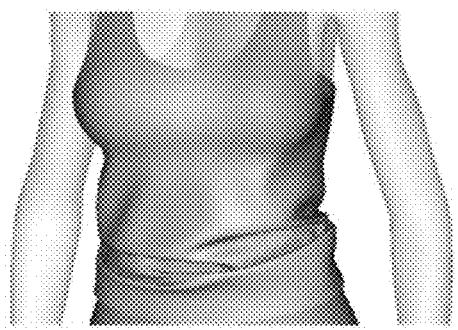
Figure 19A:
FIGS. 19A, 19B, 19C and 19D are resulting images of a texture deformed after generating according to one embodiment of the present invention.
Figure 19B:
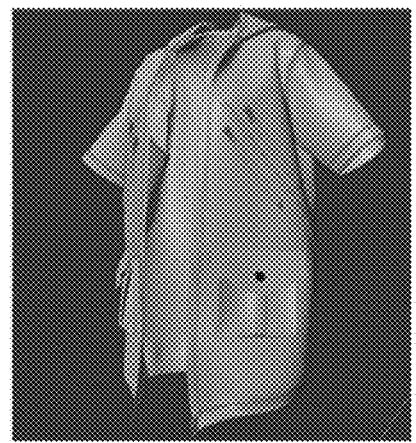
Figure 19C:
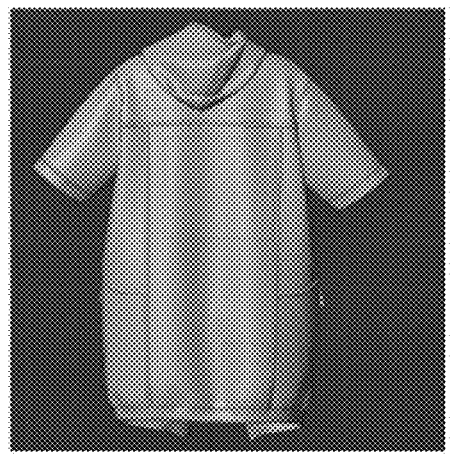
Figure 19D:
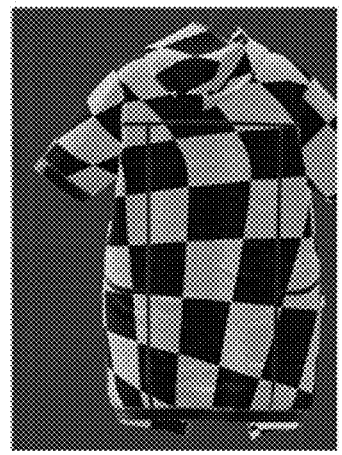

That is, the crease surface generation unit 36 forms basic creases using physics simulation, and emphasizes an effect of creases using location information about each part of the human body. FIGS. 16 and 17 show examples for results of creases generated using a crease surface generation algorithm.

Specifically, basic creases are generated first through the physics simulation based on a shape of the body. In the physics simulation, a typical technology is used [Non-Patent Document 1].

Next, locations of joints of the human body are checked from a pose estimation result.

Next, a motion state of each part of the human body is checked and analyzed based on the locations of joints. The creases are mainly generated at the joints. That is, many creases are generated depending on the extent to which joints are folded. Thus, it is important to check a state in which the joints are folded. In this case, a point of the costume model corresponding to the joint of the body model can be seen according to mapping information of the body model and the costume model.

Next, a crease profile for each part of the human body with the costume is selected. In this case, the crease profile (form and tendency) that may be generated according to location information of the human body is stored in advance, and the stored profile is fetched and used. The crease profile refers to a crease mesh, and a shape thereof that may be generated depending on the joint may be made in advance.

Next, a weight of the crease profile (frequency and height of the creases) according to a motion state for each part of the human body is assigned. The weight is a parameter that determines how much larger and deeper the pre-made creases are to be made. As a higher weight is assigned, the creases become larger and deeper, and as a zero weight is assigned, the creases have a basic form of the crease profile. In addition, as a negative weight is assigned, the creases become flatter.

Next, the total mesh area and the number of meshes are adjusted. When creases that do not exist originally are made, a mesh area of the costume model increases in proportional to the number of meshes intentionally applied for the creases. That is, in the process of making the creases, an area of the costume increases or the number of meshes increases. Therefore, the process of adjusting the area/number of meshes is a process of reducing the increased surface of the costume model to the shape similar to the area of the original mesh. A method for reducing a length of an end of the mesh closest to the crease is used.

In addition, FIGS. 18A, 18B, 18C and 18D illustrate the extent to which the creases are changed when the weight of the creases is changed.

Next, the texture mapping unit 35 maps a UV texture of the deformed 3D costume model based on the shape of the 3D body model as a target. That is, the UV texture of the original costume model is mapped to a vertex/mesh of the deformed costume model (vertex/mesh corresponding to a vertex/mesh of the original costume model). In particular, the UV texture of the original costume model is mapped to the deformed costume model with the creases.

A costume texture is applied using a correspondence relationship between the general mesh and the UV texture. A relationship for each mesh and vertex corresponding to the UV is stored, and histories of movement information about movement (change) of the mesh and vertex are all stored. This is a process in which the UV is mapped to the originally corresponding mesh as it is. FIGS. 19A, 19B, 19C and 19D show a result of mapping the texture onto the mesh. As can be seen from FIG. 19D, distortion may occur when the UV is applied (mapped) only using the correspondence relationship between the mesh and the texture.

Next, the texture updating unit 37 updates and corrects the texture.

The texture of the creases may distort the shape of the overall texture of the costume due to deformation of the 3D costume and emphasis of the creases. That is, distortion, such as pushing or buckling the texture, occurs during deformation and generation of the creases. The distorted texture needs to be smoothed out. To this end, a technology for correcting the texture using projection of the 2D image is used.

Figure 20A:
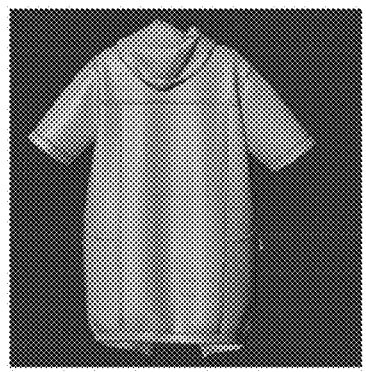
FIGS. 20A, 20B, and 20C is an updated texture image (rear image) of a 3D costume according to one embodiment of the present invention.
Figure 20B:
Figure 20C:
Figure 21A:
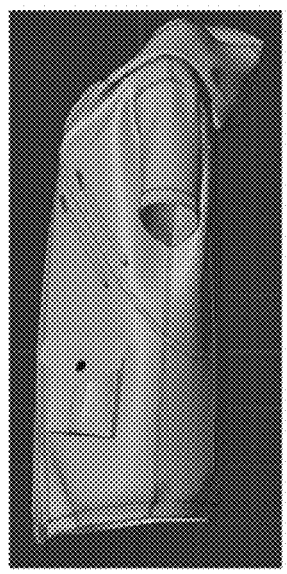
FIGS. 21A, 21B, and 21C is an updated texture image (side image) of a 3D costume according to one embodiment of the present invention.
Figure 21B:
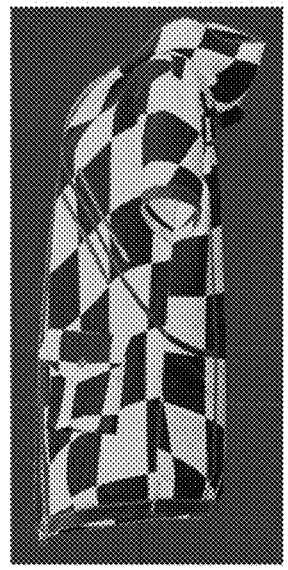
Figure 21C:
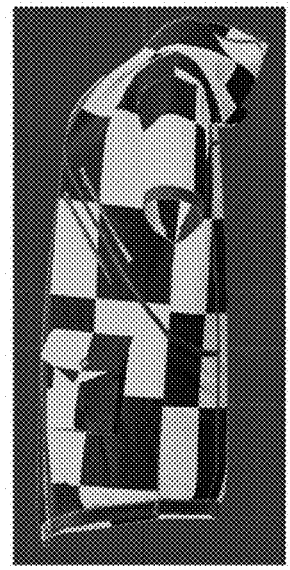
Figure 22:
FIG. 22 is a resulting image of a costume with colors according to one embodiment of the present invention.

In the process of updating the crease texture, the distortion occurred during deformation of the 3D costume model into a body model (or during generation of the creases) is minimized. As shown in FIGS. 20 and 21, when the UV texture corresponding to the mesh is applied after moving the mesh and the vertex based only on the mesh correspondence without considering the original shape of the texture at all, distortion as shown in FIGS. 20B and 21B may occur.

In the present invention, distortion of the crease texture is minimized by a method for minimizing a difference between a projected image of the original UV and a projected image of the 3D costume model (or costume model on which the creases are generated). First, a texture is applied to a 3D costume model before deformation, and projected onto a 2D image in front, rear, and side directions. Through this process, four 2D images of the 3D costume model are obtained. Next, the deformed 3D costume model (or 3D costume model on which the creases are generated) is projected onto the 2D image in the same way to obtain four 2D images. Next, two sets of the four images are compared to obtain an error value between the two sets. When the error is greater than a threshold, a correspondence relationship between the mesh of the 3D costume model and the UV texture is changed, and the projection and comparison processes are repeated again until it reaches a target error. In this case, the correspondence relationship between the mesh of the 3D costume model and the UV texture is changed using a typical conversion method such as homography conversion.

Next, the costume model renewal unit 38 corrects the texture by comparing texture region information with information about each part of the costume. In particular, the costume model renewal unit 38 separates the costume model, and corrects (renews) the texture to maintain consistency of the mesh within the corresponding region according to the separated region or corrects the texture based on a boundary between the regions.

Specifically, the costume model renewal unit 38 separates the costume model by obtaining information about each part of the deformed costume based on a body as a target. That is, a single mesh is separated as its morphological component [Non-Patent Document 2]. For example, the arms and body of the costume may be separated. The arms may also be separated based on the elbow. In addition, when information about a material is given, the costume model may be separated in more detail. Preferably, the 3D mesh is separated from the costume model based on a structure of the human body using a deep learning model that separates the 3D model.

The separated information is used as a baseline to renew the texture of the model.

In addition, the costume model renewal unit determines whether parts of the separated costume have consistent meshes or determines whether other shapes of textures are crossed based on the boundary, and corrects the texture.

Next, the mesh integrating unit 39 integrates the deformed (renewed) costume model and the body model to generate a body model fitted with the costume.

The costume and the body are treated separately. Thus, at the finish, a process of allowing the costume to be worn on the body is required. That is, the meshes of two models (costume model and body model) are overlapped in one space to integrate the two models.

Although the present invention invented by the present inventor has been described in detail with reference to the embodiments, the present invention is not limited to the above embodiments, and various modifications are possible without departing from the scope and spirit of the present invention.

What is claimed is:

1. A virtual costume fitting system comprising:
   at least one processor; and
   at least one memory including computer program code,
   wherein the computer program code includes a data input unit, a corresponding point matching unit, a costume deformation unit, a pose estimation unit, a crease surface generation unit, a texture mapping unit, a texture upgrading unit, and a mesh integrating unit,
   wherein the data input unit, when executed by the at least one processor, is configured to receive a three-dimensional body model and a three-dimensional costume model,
   wherein the corresponding point matching unit, when executed by the at least one processor, is configured to match corresponding points between the three-dimensional body model and the three-dimensional costume model,
   wherein the costume deformation unit, when executed by the at least one processor, is configured to deform the three-dimensional costume model by performing deformation transfer based on the three-dimensional body model serving as a target, using a corresponding point relationship,
   wherein the pose estimation unit, when executed by the at least one processor, is configured to estimate a pose of the three-dimensional body model,
   wherein the crease surface generation unit, when executed by the at least one processor, is configured to generate, with respect to the deformed three-dimensional costume model, creases of a costume according to joints of the pose,
   wherein the texture mapping unit, when executed by the at least one processor, is configured to map a texture of the three-dimensional costume model with respect to a costume model on which the creases are generated,
   wherein the texture upgrading unit, when executed by the at least one processor, is configured to correct a texture of the costume model,
   wherein the mesh integrating unit, when executed by the at least one processor, is configured to integrate the three-dimensional body model with the corrected costume model to generate a body model fitted with the costume, and
   wherein the corresponding point matching unit, when executed by the at least one processor, is configured to set initial corresponding points for the three-dimensional costume model and the three-dimensional body model using at least two extreme points, configured to sample a vertex ($p_i$) between the initial corresponding points in the three-dimensional costume model, configured to sample a vertex ($q_i$) between the initial corresponding points in the three-dimensional body model, configured to calculate a correspondence relationship between surfaces based on the sampled vertex ($p_i$) to calculate a connection set ($p_i$, $q_i$) of a corresponding point ($q_i$), configured to remove the connection from the connection set by regarding connection between $p_i$ and $q_i$ as a bad pair if $q_i$ already has another connection when one $p_i$ is connected to a plurality of $q_i$, and configured to match a final connection set ($p_i$, $q_i$) to the corresponding point.

2. The virtual costume fitting system of claim 1, wherein the costume deformation unit, when executed by the at least one processor, is configured to deform the costume model according to a deformation transfer method, configured to deform the costume model by performing calculation to minimize a distance between the corresponding points, and configured to deform the costume model by performing calculation on parameters of rotation, translation, scale, and shear to move the corresponding points and all vertices between the corresponding points.

3. The virtual costume fitting system of claim 1, wherein the pose estimation unit, when executed by the at least one processor, is configured to generate projection images for four directions from the three-dimensional body model, configured to extract two-dimensional (2D) joints from each projection image using a neural network, configured to restore the 2D joints in each direction into a 3D space, configured to calculate an intersection point for the joints in the 3D space, configured to estimate the calculated intersection point as a joint, and configured to estimate a skeleton connecting between the estimated joint and the joint.

4. The virtual costume fitting system of claim 1, wherein the crease surface generation unit, when executed by the at least one processor, is configured to generate basic creases through physics simulation based on a shape of the body, configured to generate the creases based on a joint, configured to generate the creases by fetching a crease profile for each part of the joint of a human body, and configured to adjust a weight of the crease profile or a total mesh area, and the number of meshes according to a motion state of the three-dimensional body model.

5. The virtual costume fitting system of claim 1, wherein the texture updating unit, when executed by the at least one processor, is configured to repeatedly deform the texture of the costume model to minimize a difference between a texture image of a projection image of the three-dimensional costume model and a texture image of a projection image of the costume model.

6. The virtual costume fitting system of claim 1, further comprising a costume model renewal unit, when executed by the at least one processor, is configured to separate the costume model, configured to correct the texture of the costume with reference to a separated region, and configured to correct the texture to maintain consistency of a mesh within a corresponding region according to the separated region or configured to correct the texture based on a boundary between regions.

* * * * *